Oct. 5, 1943.  H. FLEISHER ET AL  2,330,877
LIGHT MEASURING DEVICE
Filed Nov. 5, 1940  2 Sheets-Sheet 1
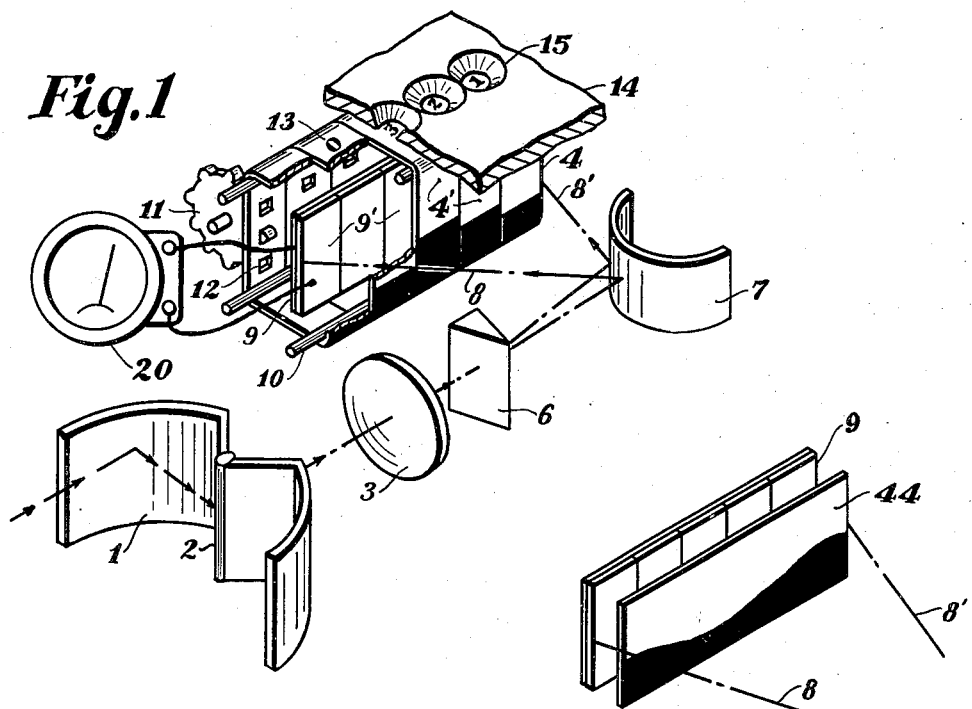
Fig. 1
Fig. 2
Fig. 3
INVENTORS

Oct. 5, 1943.  H. FLEISHER ET AL  2,330,877
LIGHT MEASURING DEVICE
Filed Nov. 5, 1940  2 Sheets-Sheet 2
*Fig. 4*
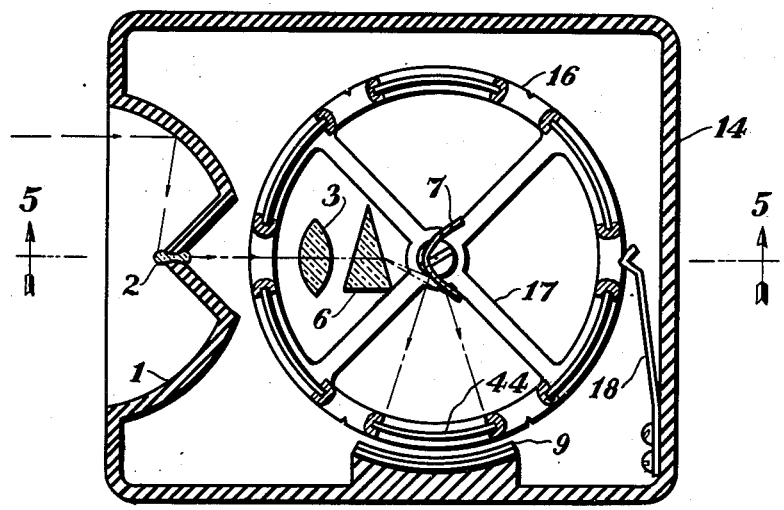
*Fig. 5*
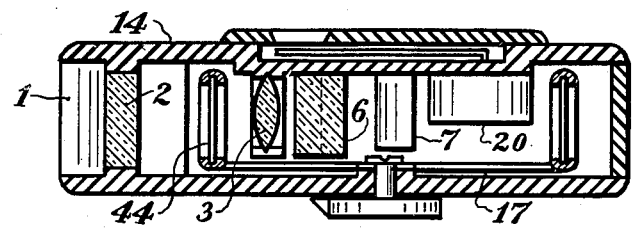
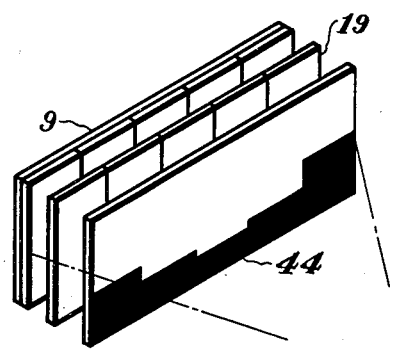
*Fig. 6*
INVENTORS
Harry Fleisher
Joseph M. Weintraub Patented Oct. 5, 1943

2,330,877

UNITED STATES PATENT OFFICE 2,330,877

LIGHT MEASURING DEVICE

Harry Fleisher and Joseph M. Weinberger, Brooklyn, N. Y.

Application November 5, 1940, Serial No. 364,428

9 Claims. (Cl. 88—23)

This invention relates to improvements in light measuring devices and more particularly to those employing photo-electric cells as exposure meters in the photographic art.

An object of this invention is to provide a measuring device in which the spectral sensitivity of the light responsive means may be matched to the spectral sensitivity of a specific photographic emulsion.

Another object of this invention is to provide a measuring device in which the spectral sensitivity of the light responsive means may be varied to predetermined conditions.

A further object of this invention is to provide a means for measuring the photographic effect of incident light, regardless of the spectral composition of said incident light.

A still further object of this invention is to provide a means for measuring the photographic effect of incident light which has passed through photographic filters without first determining the multiplying factors of said filters.

A feature of this invention resides in the construction of the light responsive cell.

Another feature of this invention resides in the manner of changing the spectral characteristics of the light responsive cell.

A further feature of this invention resides in the manner of producing a spectrum of substantially high intensity.

A still further feature of this invention resides in the manner of spreading the spectral band.

Other objects and features will become apparent from the following specifications and the accompanying drawings in which like numerals indicate identical parts and in which:

Fig. 1 is a perspective view of an embodiment of the present invention involving adjustable masking of the light-responsive cell.

Fig. 2 is a perspective view of the light receiving portion of another embodiment of the present invention involving a fixed method of masking the light responsive cell.

Fig. 3 is a front view of still another type of masking device.

Fig. 4 is a sectional view of another embodiment of this invention wherein the masking device is in the shape of a drum.

Fig. 5 is a sectional view taken along the line 5—5.

Fig. 6 is a perspective view of another embodiment of this invention wherein the spectrum is produced by interposing a series of colored filters between the masking device and the light responsive cell.

In using photographic films, it is necessary to determine the exposure time and the aperture setting of the taking camera before exposing the emulsion. For this purpose, exposure meters utilizing the sensitive surface of a photo-electric cell are employed.

One of the difficulties heretofore encountered in devices of this kind has been due to the fact that different types of emulsions and dyes of the various photographic films have differing spectral response curves. These types of films differ rather widely at the remote ends of the spectrum and vary greatly in the configuration of the curve proper.

Some types of emulsions have substantially flat spectral response curves while others may have curves which are undulant between their respective spectral limits, exhibiting a varying degree of sensitivity to light of different wavelengths.

The surface of the average photo electric cell has a spectral response curve which is quite narrow, with a rather sharp peak in a particular position in the spectral band.

Changing the material of the surface of the photoelectric cell would tend to shift the peak to another wavelength.

When such a photo-electric surface is employed in an exposure meter for the average film emulsion of wide and uniform spectral response, much of the light, to which the film responds, would not affect the exposure meter, especially if the meter is used with light which contains a large percentage of those wavelengths.

If the meter be calibrated for use with such an emulsion, the use of the meter for an emulsion of narrower spectral response, or one having sharp peaks or valleys, would result in erroneous readings.

The present invention obviates these difficulties by providing a photoelectric surface of substantially uniform spectral sensitivity, adjusting the spectral sensitivity of the said surface by placing a mask of varying transmittency or of varying transparent area in front of the said photoelectric surface and allowing the incident light, which has been dispersed into a spectrum, to impinge on the surface of the said photosensitive cell.

The masks are so designed that the area of the exposed portion of the photo-electric surface, or the sensitivity of the surface, at any wave length will be proportional to the sensitivity of the photographic emulsion at the corresponding wavelength.

Several masks, or different settings of the variable mask, will be provided for each different type of photographic emulsion.

This invention will be useful for determining the exposure time and aperture setting of the taking camera when photographing through color filters, by placing the photographic filter in front of the present meter. In this type of measurement the present invention will determine the filter factor as well as the camera settings.

The present invention will also be of value in color photography where the various types of colored emulsions have differing spectral characteristics.

Referring to Fig. 1 of the drawings, reflector 1 collects the incoming light and directs it to a cylindrical lens 2. A lens 3 focuses the image of lens 2 on the plane of the masking device 4. Interposed between the lens 2 and the mask 4 is a prism 6 which disperses the light into a spectrum. The convex reflector 7 causes the spectrum to spread out between the limits 8—8'. The spectrum is then formed on the plane of the masking device 4, and passes through the transparent portions of the masking device 4 to impinge on the photosensitive cell 9. An electric meter 20 indicates the current generated by the photoelectric cell 9.

The sensitive surface of the cell 9 is made up of strips 9', arranged in tandem. Each strip has a maximum response in the wavelength of the spectrum corresponding to its position.

The masking device 4 is made up of strips 4' corresponding to the strips 9' of the photosensitive cell.

Each masking strip 4' is a continuous band, rendered opaque for a portion of the periphery and transversely circumjacent the photosensitive cell 9. The masking strips 4' are supported on longitudinal dowels 10.

The positions of the opaque area of the masking strips 4' are set by turning the sprockets 11 which engage the masking strips 4' by means of the holes 12. On a portion of the masking strips 4' are imprinted numerals 13 or other identifying means corresponding to the positions of the opaque portions of the masking strips 4'.

The face of the enclosing case 14 is provided with windows 15 through which the respective numerals 13 will be visible.

Each type of photographic emulsion requires a predetermined series of positions of the opaque areas of masking, said positions being identified by their corresponding numerals.

The current generated by the photosensitive cell 9 actuates an indicating device 20 which is calibrated in the proper units.

The light responsive cell 9 could be made up of strips 9', each of which has a spectral response proportional to the spectral sensitivity of a particular photographic emulsion at the wavelength corresponding to the position of the strip 9'. In this case the masking device could be dispensed with and the meter would be correct for one particular emulsion.

In Fig. 2, the masking device 44 is of the fixed type. The opaque area is determined for each specific type of photographic emulsion, each emulsion requiring a different mask. The masks may be made interchangeable.

Fig. 3 is a front view of another type of masking device 44 which may be substituted for the masking device 44 in Fig. 2. This masking device 44 is a film of varying transmittency, the density at any wavelength being substantially inversely proportional to the sensitivity of the photographic emulsion at the corresponding wavelength.

In Fig. 4 and Fig. 5 the masking devices 44 are cylindrically disposed around the focal point of the convex reflector 7 and held in place by a cylindrical frame 16 which is supported by spokes 17; spaces being provided between the separate masks to allow light from lens 2 to reach lens 3 and thence through prism 6 and reflector 7 to the masking device 44; the residual light impinging on the photosensitive cell 9. The current generated by the photo-electric cell 9 being indicated by the meter 20.

The cylindrical masking device 16 is pivoted about its center and held in position by the spring detent 18.

Another embodiment of this invention is indicated in Fig. 6 wherein an approximate spectrum is produced by the interposition, between the incident light and the photosensitive surface 9, of a series of colored filters 19 arranged in tandem; each filter strip of a color corresponding to the position along the spectral band and matching the color sensitivity of the strip of the photosensitive cell 9 to which it is adjacent.

The masking means 44 could be any of those herein described and placed adjacent the filter 19.

In operation, the proper mask or mask setting is selected to match the particular photographic emulsion. The sensitive surface (or the light collecting means) is directed toward the object to be photographed. The resulting reading on the meter will indicate the settings of the taking camera.

The foregoing description does not by any means cover the possible uses of this invention nor the forms which it may assume, but serves to illustrate its fundamental principles and assemblies in which the novel features as disclosed above have been incorporated. It is obvious that changes and modifications may be made without departing from either its novel characteristics or the spirit and scope of our invention as defined in the appended claims.

What we claim as new and desire to secure by Letters Patent of the United States is:

1. A light measuring device comprising means for producing a spectrum from incident light, light responsive means disposed to receive said spectrum, said light responsive means comprising a series of light responsive strips arranged in tandem each of said strips adapted to respond to a particular substantially narrow portion of spectrum adjustable masking means intermediate said light responsive means and said spectrum producing means, said masking means comprising a plurality of strips of varying transmittency arranged in tandem and corresponding to said strips of light responsive means and adapted to individually obstruct portion of said spectrum from said light responsive strips, sprocket means engaging each masking strip for individually adjusting said masking strips, and means actuated by said light responsive means for indicating quantity of light impinging on said light responsive means.

2. A light measuring device comprising light responsive means disposed to receive incident light, said light responsive means comprsing a plurality of light responsive strips arranged in tandem, each of said strips adapted to respond to a particular substantially narrow portion of a spectrum, masking means comprising a membrane having a clear portion and an irregular opaque portion along its length, disposed parallel to the length of said spectrum and having a transmittency variable along its length to vary the extent of modification produced by the said masking means; and means actuated by said light responsive means for indicating the quantity of light impinging on said light responsive means.

3. A light measuring device comprising means for producing a spectrum from incident light, light responsive means disposed to receive said spectrum, said light responsive means comprising a plurality of light responsive strips arranged in tandem, each of said strips adapted to respond to a particular substantially narrow portion of said spectrum, masking means comprising a membrane having a clear portion and an irregular opaque portion along its length, disposed parallel to the length of said spectrum and having a transmittency variable along its length to modify the light from the said spectrum producing means; and means actuated by said light responsive means for indicating the quantity of light impinging on said light responsive means.

4. A light measuring device comprising means for producing a spectrum from incident light, light responsive means disposed to receive said spectrum, said light responsive means comprising a series of light responsive strips arranged in tandem, each of said strips adapted to respond to a particular substantially narrow portion of said spectrum, masking means intermediate said light responsive means and spectrum producing means, said masking means comprising a plurality of membranes each membrane having a clear portion and an opaque portion, arranged in tandem and corresponding to said strips of light responsive means and adapted to individually obstruct portions of said spectrum from said light responsive strips, said masking means being disposed parallel to the length of the spectrum; and means actuated by said light responsive means for indicating the quantity of light impinging on said light responsive means.

5. A light measuring device comprising means for collecting incident light into a substantially narrow band, said collecting means comprising a concave reflector and a cylindrical lens substantially at the focus of said reflector, means for producing a spectrum from said narrow band of incident light, light responsive means disposed to receive said spectrum, masking means intermediate said light responsive means and said spectrum producing means, said masking means being disposed parallel to length of said spectrum and comprising a membrane having a clear portion and an irregular opaque portion along its length and positioned to obstruct to a predetermined degree various substantially narrow portions of the said spectrum from the said light responsive means; and means actuated by said light responsive means for indicating the quantity of light impinging on said light responsive means.

6. A light measuring device comprising means for collecting incident light into a substantially narrow band, means for producing a spectrum from said narrow band, divergent reflecting means adjacent said spectrum producing means, light responsive means disposed to receive said spectrum, masking means intermediate said light responsive means and said spectrum producing means, said masking means being disposed parallel to length of said spectrum and comprising a membrane having a clear portion and an irregular opaque portion along its length to obstruct to a predetermined degree various substantially narrow portions of the spectrum from the said light responsive means; and means actuated by said light responsive means for indicating the quantity of light impinging on said light responsive means.

7. A light measuring device comprising means for producing a spectrum from incident light, light responsive means disposed to receive said spectrum, said light responsive means comprising a series of light responsive strips arranged in tandem, each of said strips adapted to respond to a particular substantially narrow portion of the spectrum, masking means intermediate said light responsive means and said spectrum producing means, said masking means comprising a plurality of masks each mask comprising a membrane having a clear portion and an irregular opaque portion along its length and arranged in cylindrical array, the said array being rotatable for interposing any mask in the path of light adjacent said light responsive means; and means actuated by said light, responsive means for indicating the quantity of light impinging on said light responsive means.

8. A light measuring device comprising means for collecting incident light into a substantially narrow band, means for producing a spectrum from said narrow band, divergent reflecting means adjacent said spectrum producing means, light responsive means disposed to receive said spectrum, said light responsive means comprising a series of light responsive strips arranged in tandem, each of said strips adapted to respond to a particular substantially narrow portion of the spectrum, masking means intermediate said light responsive means and said spectrum producing means, said masking means comprising a plurality of interchangeable masks in rotatable cylindrical array, each of said masks comprising a membrane having a clear portion and an opaque portion along its length to obstruct to a predetermined degree various substantially narrow portions of the spectrum from the said light responsive means; and means actuated by said light responsive means for indicating the integrated quantity of light impinging on said light responsive means.

9. A light measuring device comprising means for producing a spectrum from incident light, light responsive means disposed to receive said spectrum, said light responsive means comprising a series of light responsive strips arranged in tandem, each of said strips adapted to respond to a particular substantially narrow portion of the spectrum, adjustable masking means intermediate said light responsive means and said spectrum producing means, said masking means comprising a plurality of strips of varying transmittency, arranged in tandem and corresponding to said strips of light responsive means and adapted to individually obstruct portion of said spectrum from said light responsive strips, means engaging each masking strip for individually adjusting said masking strips, and means actuated by said light responsive means for indicating the quantity of light impinging on said light responsive means.

HARRY FLEISHER.
JOSEPH M. WEINBERGER.